US007857095B2

(12) United States Patent
Zhang

(10) Patent No.: US 7,857,095 B2
(45) Date of Patent: Dec. 28, 2010

(54) DEVICE WITH TRACE EMISSION FOR TREATMENT OF EXHAUST GAS

(75) Inventor: Yuguang Zhang, Room 706, No. 47, Tianshou Rood, Tianhe District, Guangzhou (CN) 510610

(73) Assignees: Yuguang Zhang, Tianhe District, Guangzhou (CN); Zhongqiang Zhang, Tianhe District, Guangzhou (CN)

( * ) Notice: Subject to any disclaimer, the term of this patent is extended or adjusted under 35 U.S.C. 154(b) by 219 days.

(21) Appl. No.: 11/939,066

(22) Filed: Nov. 13, 2007

(65) Prior Publication Data

US 2008/0178583 A1 Jul. 31, 2008

(30) Foreign Application Priority Data

Jan. 30, 2007 (CN) ........................ 2007 1 0006461

(51) Int. Cl.
*F01N 1/08* (2006.01)

(52) U.S. Cl. ....................... 181/275; 181/251; 181/257; 181/268

(58) Field of Classification Search ................. 181/232, 181/238, 239, 251, 257, 258, 259, 268, 272, 181/275; 138/39, 44, 45, 46
See application file for complete search history.

(56) References Cited

U.S. PATENT DOCUMENTS 1,229,434 A * 6/1917 Flockhart .................... 181/234
1,577,626 A * 3/1926 Warth .......................... 181/263
1,611,475 A * 12/1926 Maxim ....................... 181/249
1,914,072 A * 6/1933 John .......................... 181/239

(Continued)

FOREIGN PATENT DOCUMENTS

CN 1448622 A * 10/2003

OTHER PUBLICATIONS

Machine Translation of CN 1448622 A, obtained from: http://english.cnipr.com/newenpat/index.htm, date printed: Sep. 10, 2009.*

*Primary Examiner*—Jeffrey Donels
*Assistant Examiner*—Jeremy Luks
(74) *Attorney, Agent, or Firm*—Global IP Services; Tianhua Gu

(57) ABSTRACT

This invention relates to a kind of devices with trace emission resulted for treatment of exhaust gas. The device comprises a vessel having only one opening that serves as inlet. At least two gas exchange sections in sequence are provided inside the vessel after inlet of exhaust gas, between two gas exchange sections there is a gas mixture chamber at their connection part. The gas exchange chamber at first gas exchange section has a through opening leading to outside atmosphere area. With this configuration, on entering into the gas exchange section, exhaust gas will be ejected inwards and causes very strong entrainment, which makes the gas chamber become vacuum and sucks air with oxygen from atmosphere into gas chamber via the through opening to atmosphere. Formed high-pressure gas is burned furiously with combustible gas in the gas chamber at next stage, and the remaining exhaust gas is transferred into next gas exchange section with very high-speed revolution occurring on exhaust gas and momentum transfer. The higher negative pressure is, the more gas is consumed. In this way, the exhaust gas will be treated and only trace emission, even no emission, will be resulted.

13 Claims, 3 Drawing Sheets

U.S. PATENT DOCUMENTS

| | | | | | |
|---|---|---|---|---|---|
| 1,924,605 | A | * | 8/1933 | Haas | 181/247 |
| 2,075,316 | A | * | 3/1937 | Tyden | 181/251 |
| 3,016,972 | A | * | 1/1962 | Dugas | 181/268 |
| 3,105,570 | A | * | 10/1963 | Bezemes | 181/268 |
| 3,273,666 | A | * | 9/1966 | Hamilton et al. | 181/268 |
| 3,665,965 | A | * | 5/1972 | Baumann | 138/42 |
| 4,113,050 | A | * | 9/1978 | Smith | 181/230 |
| 4,130,173 | A | * | 12/1978 | Cooksey | 181/212 |
| 5,123,501 | A | * | 6/1992 | Rothman et al. | 181/239 |
| 5,327,941 | A | * | 7/1994 | Bitsakis et al. | 138/42 |
| 5,378,435 | A | * | 1/1995 | Gavoni | 422/177 |
| 5,529,093 | A | * | 6/1996 | Gallagher et al. | 138/44 |
| 5,758,497 | A | * | 6/1998 | Frederiksen et al. | 60/299 |
| 5,988,586 | A | * | 11/1999 | Boger | 251/127 |
| 6,050,363 | A | * | 4/2000 | Tu | 181/264 |
| 6,347,609 | B1 | * | 2/2002 | Bloomer | 123/184.57 |
| 6,722,780 | B2 | * | 4/2004 | Stein et al. | 366/176.1 |
| 2004/0256174 | A1 | * | 12/2004 | Friou | 181/258 |
| 2006/0006022 | A1 | * | 1/2006 | Gallagher et al. | 181/257 |
| 2006/0124385 | A1 | * | 6/2006 | Lucas et al. | 181/258 |

* cited by examiner

DEVICE WITH TRACE EMISSION FOR TREATMENT OF EXHAUST GAS

CROSS REFERENCE TO RELATED PATENT APPLICATION

This application claims the priority of the Chinese patent application No. 200710006461.X with a filing date of Jan. 30, 2007.

FIELD OF THE INVENTION

This Invention relates to devices for controlling pollution of exhaust gas, especially a kind of devices with trace emission for treatment of exhaust gas.

BACKGROUND OF THE INVENTION

There are many existing arts for controlling pollution of exhaust gas, for example, treatment of tail gas for motor vehicles and etc. Some techniques are based on combination of fuel and batteries to reduce emission and pollution, but techniques for disposal of used batteries are not in mature state and secondary pollution may be resulted. Some techniques are based on electrical ejection in conjunction with ternary catalytic clarifier. The China Government is promoting this technique energetically for controlling tail gas of motor vehicles.

The ternary catalytic clarifier is actually an external clarifier, which contains three metal elements, i.e. Platinum, Rhodium and Palladium, in an alveolate structure of absorption. When the temperature of the engine of motor vehicles during its operation in high speed reaches to 700~800° C.

Some chemical reactions will occur on these three elements and they effectively absorb and clarify tail gas of automobiles, therefore reduce contents of CO, HC and NOX in the tail gas and make the tail gas complies with relevant national standards on emission.

Since the ternary catalytic clarifier is an external clarifier only, the air/fuel ratio and situation of fuel pulverization in engines have great influence on its normal operation. In case any failure such as any damage of the oxygen sensor, control switch and/or air adding valve in electrical ejection device, it will cause the ternary catalytic clarifier become failure and cannot perform its intended function. In addition, the alveolate structure of the ternary catalytic clarifier is easy to be clogged and saturated, and as result, loses its clarification ability. These results in frequent replacement of clarifier and the operation cost will be increased (Generally, its normal operation period is limited within 90 days).

The ternary catalytic clarifier can play its role to reduce pollution from tail gas of motor vehicles only; it cannot eliminate the tail gas.

SUMMARY OF THE INVENTION

Aim of this Invention is to provide a kind of devices with trace emission for treatment of exhaust gas that may reduce emission of exhaust gas significantly.

For realization of above aim, this Invention provides a device with trace emission for treatment of exhaust gas, which is a vessel with openings only as inlet. At least two exchange sections are provided inside the vessel after the inlet for exhaust gas entry. Each of the exchange section has a means with jet holes, a gas exchange chamber, a means with diffusion holes and a gas mixture chamber. The jet holes are corresponding to the diffusion holes. The gas exchange chamber is provided between the means with jet holes and the means with diffusion holes, to connect both of them. A through opening to outside atmosphere area is provided at the exchange chamber of the first exchange section. Gas mixture chambers are provided at each connection part between two sequential gas exchange sections. An exhaust pipe is connected to gas mixture chamber of the last exchange section.

One improved design for this Invention is as follows: the said device with trace emission for treatment of exhaust gas has pipes of negative pressure, which connect exchange gas chambers or exchange gas chambers with corresponding gas mixture chambers located from third gas exchange section to last gas exchange section.

Another improved design for this Invention is as follows: the said device with trace emission for treatment of exhaust gas is provided with holes of laminar flow instead of jet holes in exchange section.

With this kind of configuration, the Device receives exhaust gas through its inlet with certain pressure, the exhaust gas enters into the exchange section and jets inwards. This jetting gas causes very strong entrainment effect and makes chamber become vacuum and air with oxygen being sucked into the chamber from atmosphere via the through opening to outside atmosphere. Combustible gas in this mixed gas with high pressure is burned furiously in the next gas chamber and combustible and harmful substances are decomposed in burning. The left exhaust gas is transferred into next exchange section. On entering next exchange section, exhaust gas revolves with high speed because of negative pressure in the gas chamber and the feedback effect of holes with negative pressure. The negative energy produced by the negative pressure and the working energy of the exhaust gas are balanced out each other and very strong rolling is resulted in. This causes heavy collisions and momentum transfer, i.e. "black hole" of gas. The higher the negative pressure is, the more exhaust gas is consumed, and trace amount of remaining not-consumed gas will be emitted via exhaust pipe. In this way, pollution of exhaust gas will be reduced significantly. The higher negative pressure is, the more gas is consumed. In this way, the exhaust gas will be treated and only trace emission, even no emission, will be resulted.

DETAILED DESCRIPTION OF THE INVENTION

Figure 1:
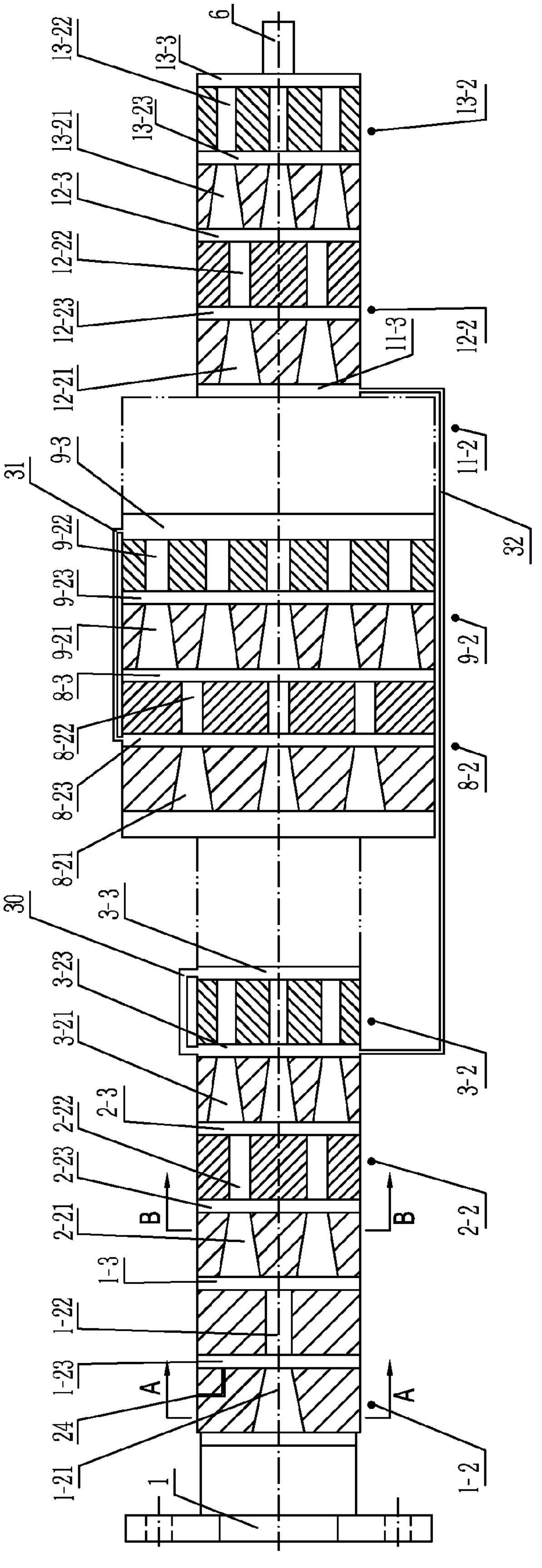
FIG. 1 is structural diagram of one embodiment of this Invention.
Figure 2:
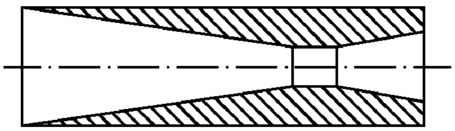
FIG. 2 is structural diagram of jet hole in this Invention.
Figure 3:
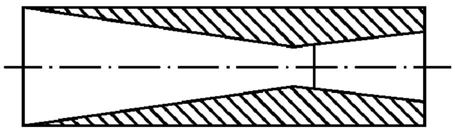
FIG. 3 is structural diagram of holes of laminar flow in this Invention.
Figure 4:
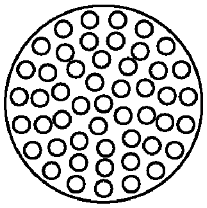
FIG. 4 is sectional view along line A-A in FIG. 1.
Figure 5:
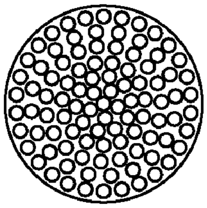
FIG. 5 is sectional view along line B-B in FIG. 1.

A device with trace emission for treatment of exhaust gas is shown in FIG. 1~5. It is a vessel with openings only as inlet 1. At least thirteen gas exchange sections in sequence are provided inside the vessel after the inlet 1 of exhaust gas. Each gas exchange section 1-2, 2-2, - - - 13-2 is provided with a means with jet holes that has a plurality of jet holes 1-21, 2-21 - - - 13-21 and a means with diffusion holes that has a plurality of diffusion holes 1-22, 2-22, - - - 13-22 corresponding to the jet holes. Gas exchange chambers 1-23, 2-23 - - - 13-23 are provided between the means for jet holes and the means for diffusion holes correspondingly, connecting to both of them. A through opening 24 leading to outside atmosphere area is provided at the gas exchange chambers 1-23 of the first exchange section 1-2. Gas mixture chambers 1-3, 2-3 - - - 13-3 are provided at each connection part between two sequential gas exchange sections 1-2, 2-2 - - - 13-2, connecting the two neighbor sections. An exhaust pipe 6 is connected to gas mixture chamber 13-3 of the last gas exchange section 13-2. A pipe 32 of negative pressure is provided between the gas exchange chamber 3-23 of third gas exchange section and the gas mixture chamber 11-3 of the eleventh gas exchange section 11-2, connecting them. A pipe 31 of negative pressure is provided between the gas exchange chamber 8-23 of the eighth gas exchange section and the gas mixture chamber 9-3 of the ninth gas exchange section 9-2, connecting them. A pipe 30 of negative pressure is provided for the third to twelfth gas exchange sections to connect the gas exchange chamber 3-23, 4-23 - - - or 12-23 and its corresponding mixture gas chamber 3-3, 4-3 - - - or 12-3 in each gas exchange section. Jet holes 1-21, 2-21 - - - 13-21 of the gas exchange sections 1-2, 2-2 - - - 13-2 may be replaced with holes of laminar flow.

Figure 6:
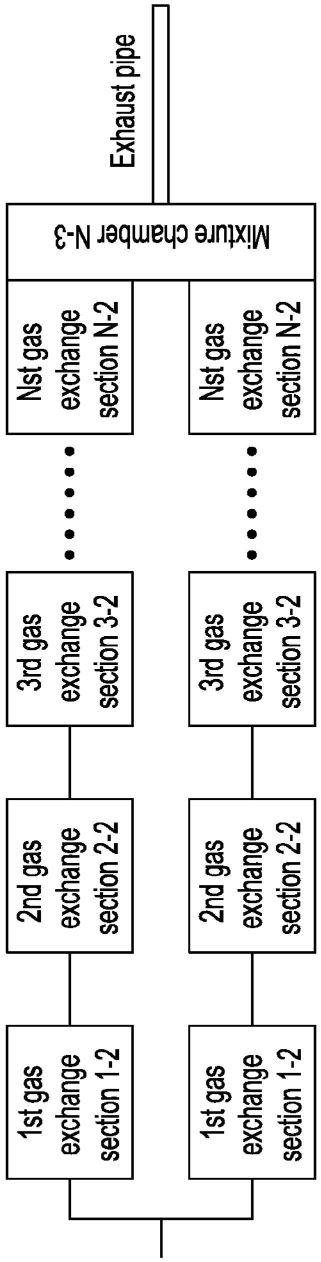
FIGS. 6 & 7 are diagrams showing the devices are connected in parallel mode.
Figure 7:
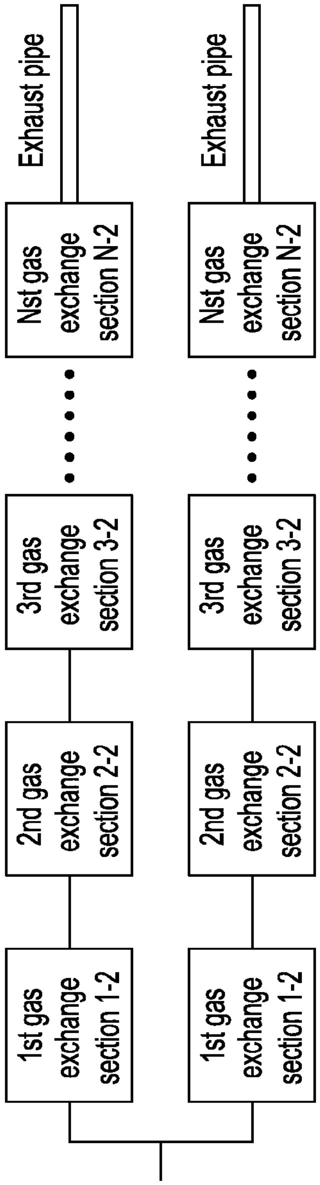

For one best embodiment, there are 13 gas exchange sections. The first gas exchange section 1-2 has 50 jet holes 1-21 and 50 corresponding diffusion holes 1-22. The second gas exchange section 2-2 has 100 jet holes 2-21 and 100 corresponding diffusion holes 2-22. The third, fourth, fifth, sixth and seventh exchange sections (3-2 - - - 7-2), each has 150 jet holes and 150 corresponding diffusion holes. The eighth gas exchange section 8-2 has 150 jet holes 8-21 and 150 diffusion holes 8-22. The ninth, tenth and eleventh exchange sections, each has 300 jet holes and 300 corresponding diffusion holes As shown in the FIG. 6 and FIG. 7, it is allowed to have a mode in parallel connection. The first series connection of first gas exchange section, second gas exchange section, - - - and nth gas exchange section connects with the second series connection of first gas exchange section, second gas exchange section, - - - and nth gas exchange section in parallel, then make last two gas mixture chambers together, and a exhaust pipe is connected with the joined gas mixture chamber. Also, the last two mixture chambers can keep independent; two exhaust pipes are connected with the two gas mixture chambers respectively.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

Prototype of this invention has been produced and only trace emission of exhaust gas is found out in testing of this prototype.

What is claimed is:

1. A device with trace emission for treatment of exhaust gas comprising:

a vessel having an inlet for receiving exhaust gas, a plurality of exchange sections located inside the vessel after the inlet for receiving exhaust gas;

each exchange section including a means with jet holes, a gas exchange chamber, a means with diffusion holes, and a gas mixture chamber;

the gas exchange chamber being located between the means with jet holes and the means with diffusion holes to connect the means with jet holes and the means with diffusion holes together;

a through opening leading to the atmosphere provided at the first gas exchange chamber; the gas mixture chamber being located between two sequential exchange sections after the means with diffusion holes; an exhaust pipe provided with a last gas mixture chamber; wherein from a third gas exchange section to a last gas exchange section at least one of the gas exchange chambers being connected with another one of the gas exchange chambers by a pipe of negative pressure, or at least one of the gas exchange chambers being connected with one of the gas mixture chambers by a pipe of negative pressure.

2. The device with trace emission for treatment of exhaust gas of claim 1, wherein the device has 13 exchange sections, each exchange section includes the means with jet holes, the gas exchange chamber, the means with diffusion hole, the gas mixture chamber, the exhaust pipe is provided with the gas mixture chamber of the last exchange section, the through opening is provided at the gas exchange chamber of first gas exchange section.

3. The device with trace emission for treatment of exhaust gas of claim 2, wherein the pipe of negative pressure connects the gas exchange chamber of third gas exchange section with the gas mixture chamber of the eleventh gas exchange section.

4. The device with trace emission for treatment of exhaust gas of claim 2, wherein the pipe of negative pressure connects the gas exchange chamber of eight gas exchange section with the gas mixture chamber of the ninth gas exchange section.

5. The device with trace emission for treatment of exhaust gas of claim 2, wherein the pipe of negative pressure connects the gas exchange chamber with the gas mixture chamber in each gas exchange section from the third to twelfth gas exchange section.

6. The device with trace emission for treatment of exhaust gas of claim 2, wherein the pipe of negative pressure connects the gas exchange chamber of third gas exchange section with the gas mixture chamber of the eleventh gas exchange section; the pipe of negative pressure connects the gas exchange chamber of eight gas exchange section with the gas mixture chamber of the ninth gas exchange section.

7. The device with trace emission for treatment of exhaust gas of claim 2, wherein the jet holes can be replaced by laminar flow holes.

8. The device with trace emission for treatment of exhaust gas of claim 2, wherein the means with jet holes and the means with diffusion holes of the first gas exchange section have 50 jet holes and 50 diffusion holes respectively.

9. The device with trace emission for treatment of exhaust gas of claim 2, wherein the means with jet holes and the means with diffusion holes of the second gas exchange section have 100 jet holes and 100 diffusion holes respectively.

10. The device with trace emission for treatment of exhaust gas of claim 2, wherein the means with jet holes and the means with diffusion holes of the third, fourth, fifth, sixth and seventh gas exchange sections have 150 jet holes and 150 diffusion holes respectively.

11. The device with trace emission for treatment of exhaust gas of claim 2, wherein the means with jet holes and the means with diffusion holes of the ninth, tenth and eleventh gas exchange sections have 300 jet holes and 300 diffusion holes respectively.

12. The device with trace emission for treatment of exhaust gas of claim 2, wherein the device can be in parallel connection, a first series connection of the first gas exchange section, second gas exchange section, to an $n^{th}$ gas exchange section connects with the second series connection of the first gas exchange section, second gas exchange section to an $n^{th}$ gas exchange section in parallel, wherein $n<13$, two last gas mixture chambers of the first and second connections are combined as one combining gas mixture chamber, and a exhaust pipe is connected with the combining gas mixture chamber.

13. The device with trace emission for treatment of exhaust gas of claim 12, wherein the two last gas mixture chambers of the first and second connections keep independent, two exhaust pipes are connected with the two last gas mixture chambers respectively.

* * * * *